US012706232B2

(12) United States Patent
Ainger et al.

(10) Patent No.: US 12,706,232 B2
(45) Date of Patent: Aug. 11, 2026

(54) CABLE SYSTEM

(71) Applicant: Landways Management Limited, London (GB)

(72) Inventors: Michael Ainger, London (GB); Michael Dixon, London (GB); Nathan Kelly, London (GB); David Stockton, London (GB)

(73) Assignee: Landways Management Limited, London (GB)

( * ) Notice: Subject to any disclaimer, the term of this patent is extended or adjusted under 35 U.S.C. 154(b) by 791 days.

(21) Appl. No.: 17/909,970

(22) PCT Filed: Mar. 11, 2021

(86) PCT No.: PCT/GB2021/050617
§ 371 (c)(1),
(2) Date: Sep. 7, 2022

(87) PCT Pub. No.: WO2021/181106
PCT Pub. Date: Sep. 16, 2021

(65) Prior Publication Data

US 2025/0279224 A1 Sep. 4, 2025

(30) Foreign Application Priority Data

Mar. 11, 2020 (GB) ..................................... 2003556

(51) Int. Cl.
*G02B 6/44* (2006.01)
*G02B 6/52* (2006.01)
(Continued)

(52) U.S. Cl.
CPC ........... *H01B 9/003* (2013.01); *G02B 6/4452* (2013.01); *G02B 6/4453* (2013.01); (Continued)

(58) Field of Classification Search
CPC .... H01B 11/22; G02B 6/4452; G02B 6/4453; G02B 6/4457; G02B 6/52
See application file for complete search history.

(56) References Cited

U.S. PATENT DOCUMENTS 4,549,041 A 10/1985 Shingo et al.
6,897,382 B2 5/2005 Hager et al.
(Continued)

FOREIGN PATENT DOCUMENTS

CN 104810106 A 7/2015
CN 107068252 A 8/2017
(Continued)

OTHER PUBLICATIONS

Plumettaz et al., "High Voltage Energy Cables Go Underground—How to Improve Installation Efficiency," *Proceedings of the 58th IWCS/IICIT*, pp. 169-174, 2009.

*Primary Examiner* — Sung H Pak
(74) *Attorney, Agent, or Firm* — Seed Intellectual Property Law Group LLP

(57) ABSTRACT

The invention provides a cable for power distribution and/or data transmission, the cable comprising a core comprising one or more metallic conductors and a sheath surrounding the core, the sheath being formed from a polymer having a tensile modulus of at least 1.5 GPa, wherein the outside diameter of the sheath is no more than 13.5 mm and the stiffness of the cable is at least 0.01 $Nm^2$. Advantageously, embodiments of the cable can be readily blown and pushed through a microduct without deforming.

13 Claims, 7 Drawing Sheets

(51) Int. Cl.

| | |
|---|---|
| ***H01B 7/18*** | (2006.01) |
| ***H01B 9/00*** | (2006.01) |
| ***H01B 11/16*** | (2006.01) |
| ***H01B 11/22*** | (2006.01) |

(52) U.S. Cl.

CPC ............. *G02B 6/4457* (2013.01); *G02B 6/52* (2013.01); *H01B 7/183* (2013.01); *H01B 11/16* (2013.01); *H01B 11/22* (2013.01)

(56) References Cited

U.S. PATENT DOCUMENTS

| | | | | |
|---|---|---|---|---|
| 8,013,251 | B2 | 9/2011 | Bhandari et al. | |
| 8,525,031 | B2 | 9/2013 | Hager et al. | |
| 10,377,858 | B2 | 8/2019 | Shen et al. | |
| 2004/0050579 | A1 | 3/2004 | Hager et al. | |
| 2005/0258410 | A1 | 11/2005 | Andrews | |
| 2013/0266280 | A1* | 10/2013 | Sakabe .................... | H01R 3/00 385/101 |
| 2017/0269320 | A1* | 9/2017 | Xu ..................... | H01B 13/0003 |
| 2017/0309370 | A1 | 10/2017 | Tanaka et al. | |

FOREIGN PATENT DOCUMENTS

| | | | |
|---|---|---|---|
| EP | 2592707 | A1 | 5/2013 |
| JP | S60189114 | A | 9/1985 |
| JP | H05328568 | A | 12/1993 |
| JP | H11213778 | A | 8/1999 |
| JP | 2010060724 | A | 3/2010 |
| JP | 2014072123 | A | 4/2014 |
| WO | 2018162401 | A1 | 9/2018 |

* cited by examiner

System Schematic

Free Standing FDF Showing Discrete Positions For Micro Duct Terminations

Test Circuit

Effect of stiffness on pushing/ blowing performance

Three Point Bending Method to Determine Stiffness ('B' or 'EI')

CABLE SYSTEM

TECHNICAL FIELD

The present invention relates to cable systems, in particular a cable system that integrates optical fiber and metallic (e.g., copper media), a metallic (e.g., copper) cable suitable for use in the cable system and installations employing the cable system.

BACKGROUND

Description of the Related Art

Optical fiber is acknowledged as a superior medium for the conveyance of both digital and analogue signals when compared to copper. However, copper is acknowledged as superior for the conveyance of power. As more and more devices situated at ever higher densities require optical fibers connections, the question of how to efficiently deliver power to the devices at the ends of those fibers becomes more pressing.

A good example of this is radio transceivers, in the form of public (4G and 5G) or private (WiFi) small cells, which are increasingly required throughout buildings and high-density open spaces. Each require both optical fiber and power. Whilst these can be delivered using separate infrastructures, there are considerable benefits in terms of efficiency, deployment speed, and security of supply, in delivering both media in an integrated manner.

The integration of both optical fiber and copper media within a single cable has been suggested for example in CN107068252 (A). However, should a change in specification of one of these occur (for example the power supply is upgraded to require larger conductors, or the optical fiber to a new generation), then both must be changed. This will lead to higher than necessary cost, and a (temporary) cessation of service to the customer.

In addition, power and optical fiber communications cables are usually routed to different locations at either one or both ends of the system. Where a combined power and communications cable is used it can be inconvenient for both to be too closely coupled at the origin and destination, since different skilled persons may be needed to handle each media type. Termination practices are very different for optical fibers and copper conductors—for example copper conductors lend themselves to intermediate connection without breaking the conductor (whereas optical fibers do not) and termination is made much more complex where both are combined in the same cable.

The installation of optical fibers into microducts (being tubes of typically less than 20 mm outside diameter) has been accepted practice for over a decade and is a highly efficient method of deployment. GB2241121 illustrates one known example of optical fiber microducts.

The installation of large copper power cables in conventional ducts (greater than 20 mm outside diameter) using floating (in particular to assist with pushing and/or pulling) has been proposed, but not widely adopted (see G. Plumettaz, J. Heinonen, "High voltage energy cables go underground-how to improve installation efficiency," Proc. 58th IWCS (2009) 169-174). Floating systems require the provision and normally wastage of large volumes of water and is generally considered more suitable for very large and heavy products.

US2005258410 and CN104810106 describe approaches to blowing-in optical fibers.

BRIEF SUMMARY

Aspects of the present invention are based on a recognition that it would be beneficial to install, by blowing and/or pushing, copper (or other metallic conducting) cables of sufficient size for the supply of:

a) significant levels of power (e.g., above 100 W and as high as 5000 W), and b) lower levels (e.g., up to 100 W) of power with the option to also convey ethernet data signals into the same microducts designed for the installation (by blowing and/or pushing) of optical fiber, alongside such fibers, over significant distances (typically up to 1000 m).

Were this possible, it would deliver a very efficient way to integrate the delivery of both power and signals.

According to a first aspect of the present invention, there is provided a cable for power distribution and/or data transmission, the cable comprising:

a core comprising one or more metallic conductors; and a sheath surrounding the core, the sheath being formed from a polymer having a tensile modulus of at least 15 GPa;

wherein the outside diameter of the sheath is no more than 13.5 mm; and the stiffness of the cable is at least 0.01 $Nm^2$.

The proposed construction, with a relatively large diameter, relatively high modulus sheath bound tightly around the metallic core, can result in a cable that can be readily blown and pushed through a microduct without deforming, despite metallic conductors' tendency to plastically deform under axial compressive loads. In effect, this is the reverse of a typical optical fiber, where it tends to be the bundle of fibers in the core of the cable that provide the desired stiffness, with the sheath adding very little.

In some embodiments the metallic conductor is a copper conductor, an aluminum conductor or a conductor made from an alloy or either one or both of these metals.

In some embodiments, the outside diameter of the sheath is at least 4.5 mm.

In some embodiments, the cable includes a barrier layer around the core, between the core and the sheath. The barrier layer can be formed from a tape either wound spirally or applied longitudinally around the core.

In some embodiments, the cable includes an electrical insulating sleeve around the or each conductor.

In some embodiments, the core comprises a plurality of twisted conductor (e.g., copper conductor) pairs.

In some embodiments, the outer surface of the sheath has a coefficient of friction of 0.3 or less.

In some embodiments, the sheath is fire retardant.

In some embodiments, the tensile modulus of the polymer from which the sheath is formed is at least 2 GPa.

In some embodiments, the stiffness of the cable is in the range 0.01 to 0.1 $Nm^2$.

In some embodiments, the power transmission capacity of the cable is at least 70 W and in other embodiments at least 100 W.

According to a second aspect of the present invention, there is provided a flexible distribution frame for a power and data network, the distribution frame comprising:

a support structure; and a plurality of termination cassettes supported by the support structure;

at least one of the termination cassettes being adapted for termination of a plurality of optical fibers; and at least one other of the termination cassettes being adapted for termination of metallic (e.g., copper) conductors.

The flexible distribution frame provides a convenient, flexibly configurable, way to terminate both optical fibers and metallic conductors (whether for data or power) in the same location, rather than having to provide separate distribution frames for optical and metallic conductor termination or sacrifice the flexibility of a distribution frame and terminate cables directly to equipment.

In some embodiments, the distribution frame comprises at least one termination cassette adapted for terminating multi-pair metallic conductors and at least one other termination cassette adapted for terminating (one or more) single core metallic conductors.

In some embodiments, the support structure comprises a plurality of shelves (or trays) and the termination cassettes are supported on the shelves (or trays).

In some embodiments, a plurality of cassettes adapted for terminating metallic conductors are supported on one or more of the plurality of shelves (or trays) and a plurality of cassettes adapted for terminating optical fibers are supported on one or more shelves (or trays) of the plurality of shelves (or trays) different from the one or more shelves (or trays) that support the cassettes adapted for terminating metallic conductors.

In some embodiments, at least one of the plurality of shelves (or trays) supports termination cassettes of different types.

In some embodiments, each shelf (or tray) supports more than one termination cassette.

In some embodiments, the termination cassettes are removable from and replaceable on the support structure.

Some embodiments provide a distribution frame comprising:

a first compartment within which the support structure and termination cassettes are housed;

a second compartment to one side of the first compartment into which cables can extend for termination at one side of the termination cassettes; and a third compartment to another side of the first compartment opposite the second compartment providing access to an opposite side of the termination cartridges for patching and jumper cabling.

According to a third aspect of the present invention, there is provided a cable system comprising: one or more bundles of microducts, each bundle comprising a plurality of microducts;

at least one optical fiber installed in one of the plurality of microducts;

at least one metallic (e.g., copper) conductor cable installed in another of the plurality of microducts; and at least one distribution frame into or through which the bundle extends and in which some or all of the optical fiber and the metallic conductor are terminated.

This system enables optical fibers and metallic cables to be installed alongside one another in the same bundle (i.e., within different microducts within the same bundle) but avoids the need to replace both media types if one fails or a change in specification is required.

In some embodiments, the cable system includes a plurality of microduct bundles, all of which terminate in the distribution frame.

In some embodiments, the one or more metallic (e.g., copper) conductor cables are cables in accordance with the first aspect above.

In some embodiments, the distribution frame is a distribution frame according to the second aspect above.

According to a fourth aspect of the present invention, there is provide a method of installing cables comprising:

installing one or more microduct bundles, each bundle comprising a plurality of microducts; blowing at least one optical fiber into one of the plurality of microducts;

blowing at least one metallic (e.g., copper) conductor cable into another of the plurality of microducts; and terminating the optical fiber and the metallic conductor at a distribution frame.

In some embodiments of the method, the one or more metallic (e.g., copper) conductor cables are cables in accordance with the first aspect above.

The skilled person will appreciate that the features described and defined in connection with the aspects of the invention and the embodiments thereof described above can be combined in any combination, regardless of whether the specific combination is expressly mentioned herein. Thus, all such combinations are considered to be made available to the skilled person.

BRIEF DESCRIPTION OF THE SEVERAL VIEWS OF THE DRAWINGS

So that the invention may be more readily understood, and so that further features thereof may be appreciated, embodiments of the invention will now be described by way of example with reference to the accompanying drawings in which.

DETAILED DESCRIPTION

As noted above, one general aim of the present invention is to enable copper or other metallic cables having relatively high power transmission capacity and/or that afford Ethernet data transmission (with or without power), to be installed into the same microducts designed for the installation (by blowing and/or pushing) of optical fiber, alongside such cables (but not within the same individual ducts), over significant distances (typically up to 1000 m).

Until now, this has not been thought possible as the physical characteristics of cables with sufficient copper (or, e.g., aluminum or other metallic) content (1.64 $mm^2$ in the case of gigabit ethernet requiring category 5 or 6 cables, and much higher in the case of single conductor cables, typically up to 5.6 $mm^2$, have not been suitable for blowing/pushing. In particular, relatively large forces must be applied to progress a cable through a microduct, and existing cables are insufficiently stiff and deform plastically under even the modest pushing forces.

As an example, a variety of standard designs of Category 5e data cables, of outside diameters between 4.7 mm and 4.85 mm were tested using pushing/blowing into a 7/5.5 mm microduct. The maximum distance achieved before the cable plastically deformed was 8 m, making such an installation of very limited practical use.

For the purposes of illustration, embodiments of the invention are described below with reference to copper cables (copper alloys may also be used). However, embodiments of the invention can also be implemented with aluminum cables (i.e., aluminum or aluminum alloys) and a number of other suitable metallic conductors.

Figure 1:
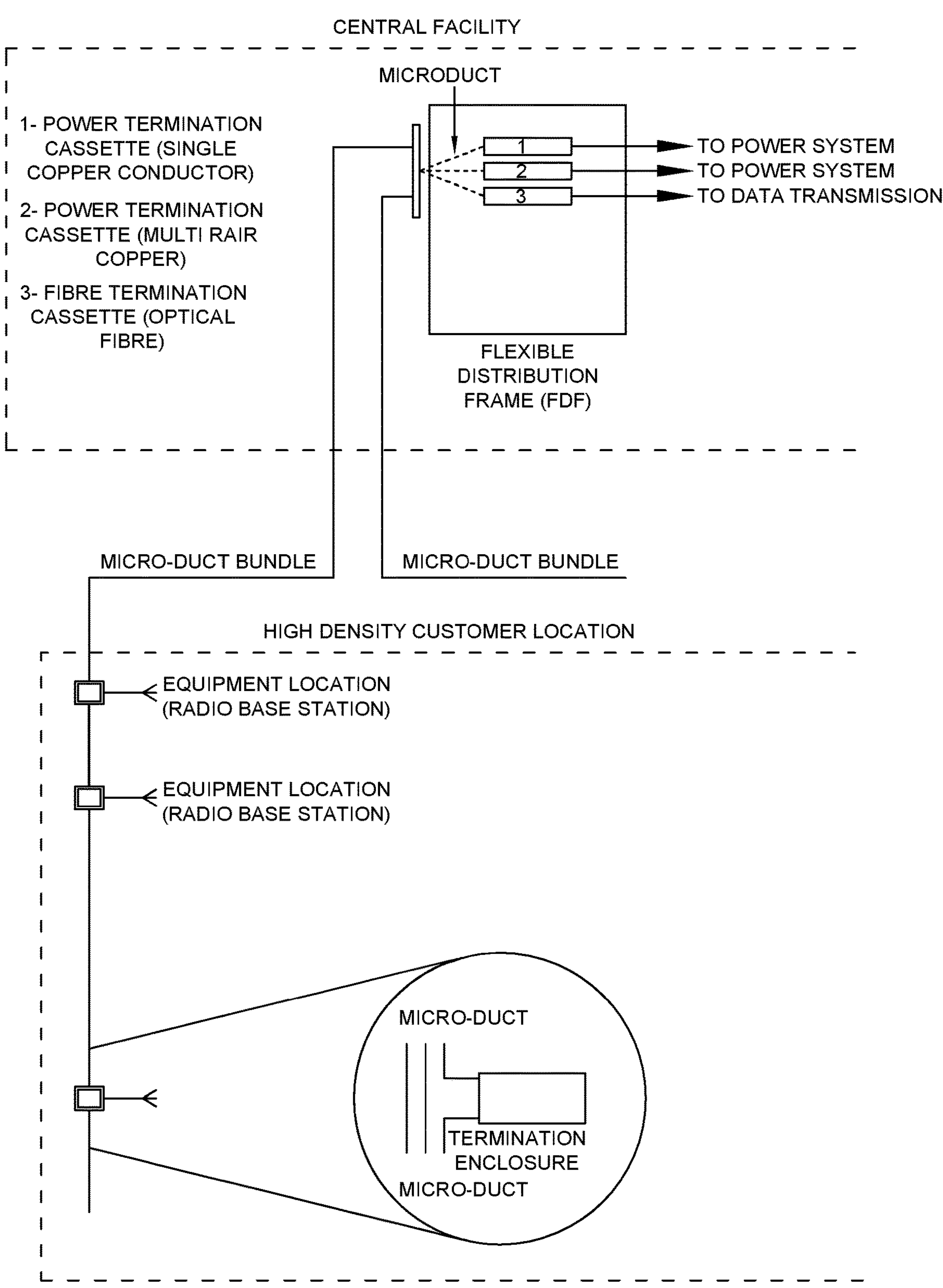
FIG. 1 schematically illustrates a system in accordance with an embodiment of the third aspect of the invention.

Turning to FIG. 1, in one aspect the present invention proposes a cable system, as schematically illustrated in this figure. In this example, the system is for cabling in a building, in which there is a requirement for a high density of both power supply and data transmission to multiple radio transmitters.

The system uses bundles of microducts (e.g., from 2 to 24 microducts in each bundle). Each microduct can be from 5/3.5 mm (OD/ID) to 20/15 mm.

The bundle of microducts, can be of any suitable construction, including known examples already used for blown/pushed optical fibers. One suitable microduct arrangement that can be used is as described in GB2241121.

Optical fibers and copper conductor cables are air-blown into the microducts. The optical fibers in this example are packaged as Air-Blown optical Fiber Units (ABFUs), examples of which are readily available and well known to the skilled person. The copper conductor cables used in this example are termed Air-Blown-Copper Cables (ABCCs) (being either multi-pair or single conductor). These copper cables may be cables in accordance with the first aspect of the invention, as exemplified below. In some cases, further microducts of other sizes may be added for population with either further ABFUs or further ABCCs.

The system also includes a Flexible Distribution Frame (FDF), for example in accordance with the second aspect of the invention, situated at the end of each bundle. In the FDF, each microduct is terminated on either:

a) an optical fiber termination cassette (which may be of a well-known type);

b) a multi-pair copper cable termination cassette; or c) a single (or dual) conductor copper cable termination cassette.

Advantageously, as separating a bundle of microducts into its constituent individual ducts can be simply performed while leaving the media inside the microduct undisturbed, microducts can be flexibly assigned to different types of cassettes as required.

More specifically, in the case where large numbers of microducts are to be terminated (typically 9+), a free-standing closed rack or open frame structure of a type commonly used as an Optical Distribution Frame (ODF) is preferably used. Within the rack/frame each microduct is routed to a discrete position for termination, e.g., a specific shelf or splice tray.

Alternatively, a non-free-standing termination enclosure of a type similar to those commonly used as an optical fiber termination enclosure can be used, performing the same function, but typically for lower numbers of microducts (e.g., 2-8).

Figure 2:
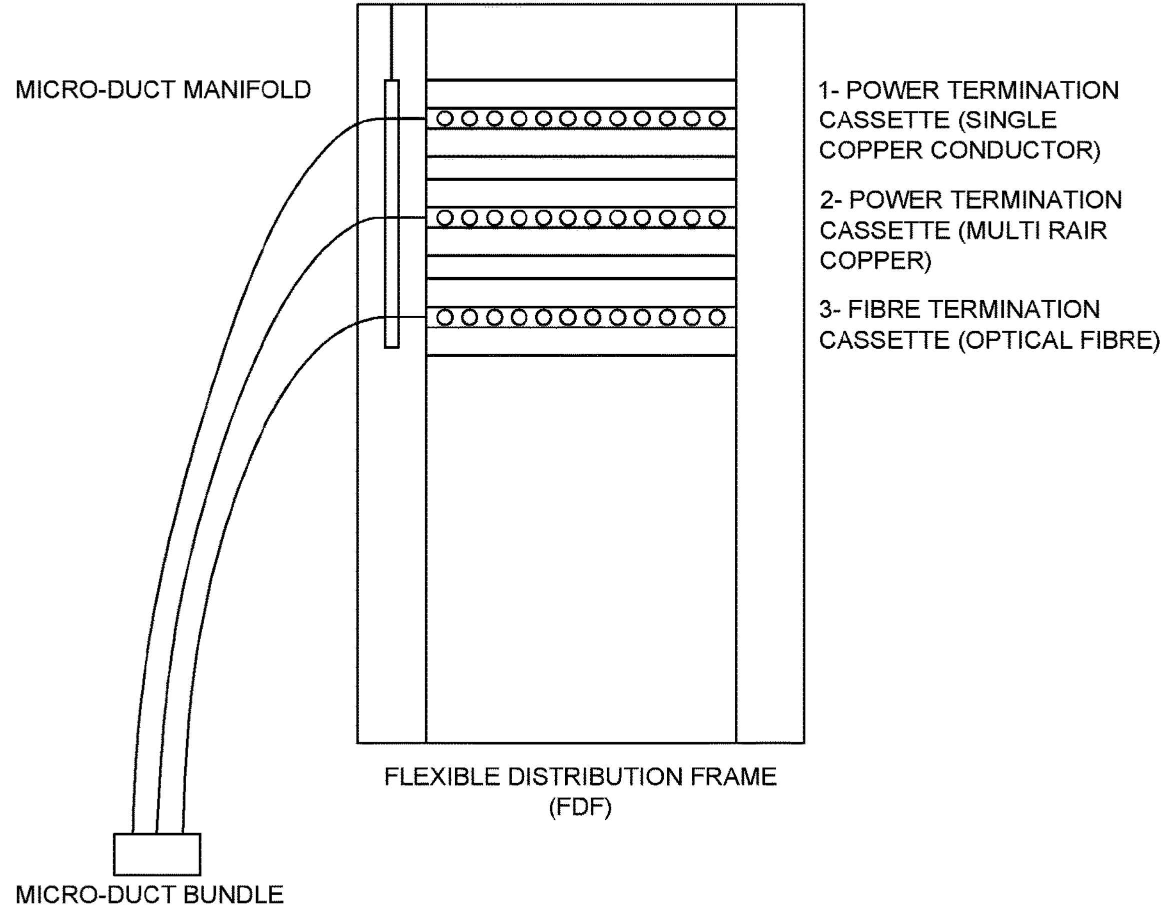
FIG. 2 illustrates a flexible distribution frame in accordance with an embodiment of the second aspect of the invention, which can be used with the system of FIG. 1.

FIG. 2 illustrates an example of a flexible distribution frame that can be used in the system of FIG. 1 to terminate optical fibers, multi-pair copper cables and single copper cables.

The fiber and power termination shelf compartment is configured to allow installation of multiple fiber and power termination shelves to hold cassettes at which the ABFUs and ABPCCs are terminated. They also provide the facility to connect patching and jumper cables in a conventional manner.

In some examples, the shelves are segregated by function, for example one or more for optical fiber termination, one or more for multi-pair copper termination, and one or more for single conductor copper termination. This has the advantage that different operational and/or safety constraints as may exist in each media type (for example bend radius management for fiber and insulation, earthing or other electrical safety precautions required when copper conductors are to be energized at other than intrinsically safe voltages), can be accommodated in each shelf.

It is also possible for shelves to be mixed, in which case the required or desired operational and safety constraints can be addressed at the cassette level.

The cassettes can be provided as trays mounted at discrete positions on shelves and are adapted to enable the termination and/or connection of multiple optical fibers or copper conductors.

In some embodiments, the type and position of cassettes may be interchanged or the cassettes replaced to reconfigure the distribution frame.

Each shelf in the distribution frame may hold one or more cassettes.

The optical fiber termination cassette can be of a well-known type.

Figure 3:
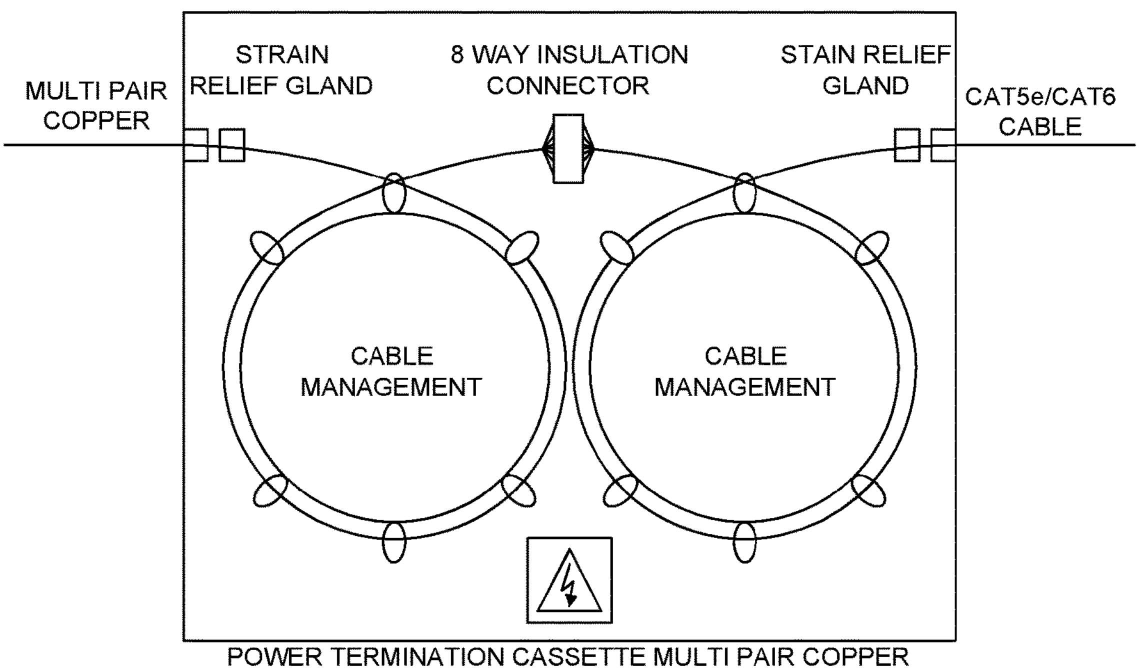
FIG. 3 illustrates a multiple copper conductor termination cassette for use with the distribution frame of FIG. 2.

An example design of multi-pair copper termination cassette is shown in FIG. 3, in this example for connecting the end of a multi-pair copper cable (e.g., an air-blown copper cable—"ABCC") to a CAT5e/CAT6 cable (e.g., a patchcord, with optional bulkhead/tombstone connection).

The multi-pair copper cable enters the cassette from one side through strain relief gland and the CAT5e/CAT6 cable (or patch cord) exits from the opposite side of the cassette, also through a strain relief gland. The cable ends are connected to one another through an 8-way insulation displacement connector. The cassette includes a cable management arrangement within which spare cable can be stowed within the cassette.

Figure 4:
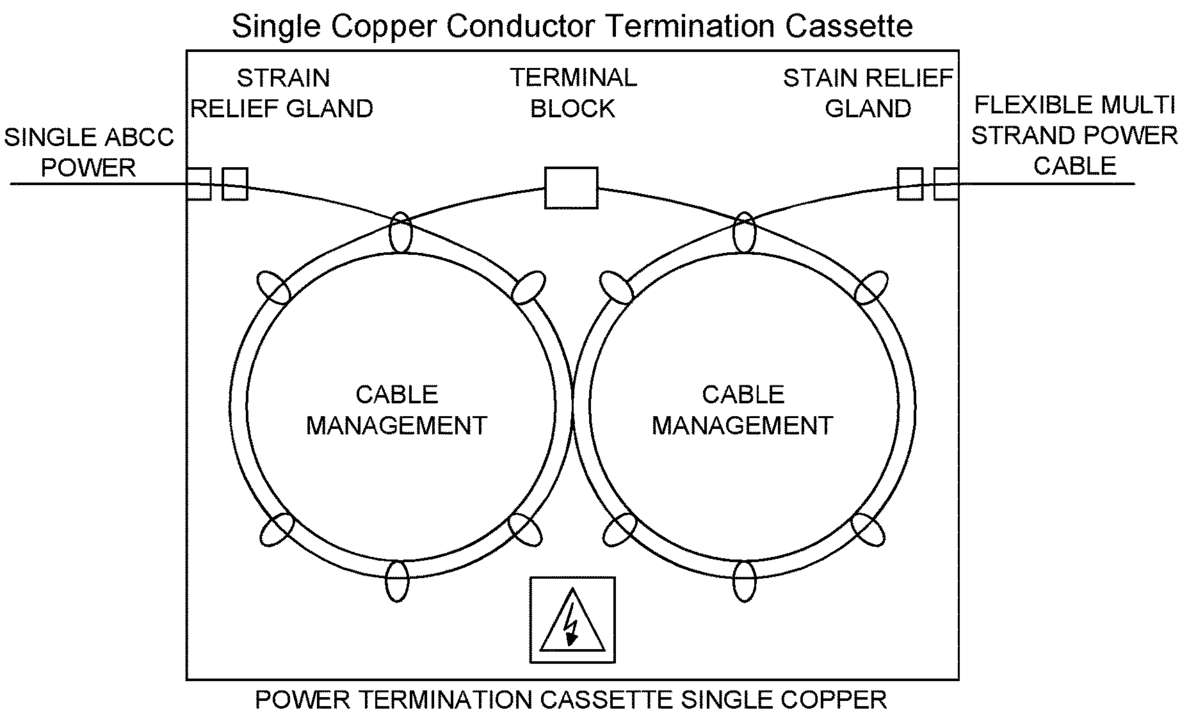
FIG. 4 illustrates a single copper conductor termination cassette for use with the distribution frame of FIG. 2.

An example design of single conductor copper termination cassette is shown in FIG. 4, in this example for connecting the end of a single conductor copper cable to a flexible multi-strand power cable. The configuration of the cassette is largely the same as the cassette illustrated in FIG. 3, with the two cable ends being connected in this case with a screw terminal block (but screw connection could equally advantageously be a splice or crimp connection).

In the example of FIG. 4, the power cable could be a power patch cable with an optional, suitably rated, electrical connector.

In some cases, the termination cassettes may include single or double insulating covers where required, e.g., for electrical safety. An earth terminal may be provided to metallic parts and connected when required for a particular installation.

A particularly advantageous and unique feature of this approach is that each microduct can be individually assigned and re-assigned between the three media types (optical, multi-pair copper, single copper) and the corresponding cassettes can be easily changed to correspond with the function assigned.

Figure 5:
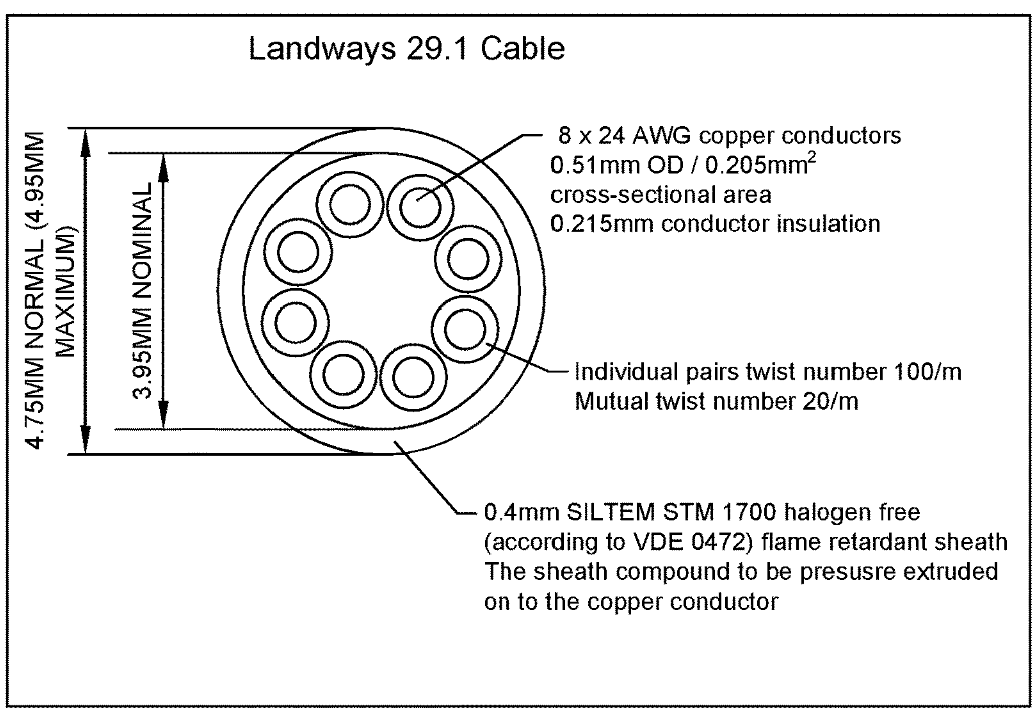
FIG. 5 shows a schematic cross-sectional view of a copper cable in accordance with an embodiment of the first aspect of the present invention, having multiple twisted pairs of copper conductors.
Figure 6:
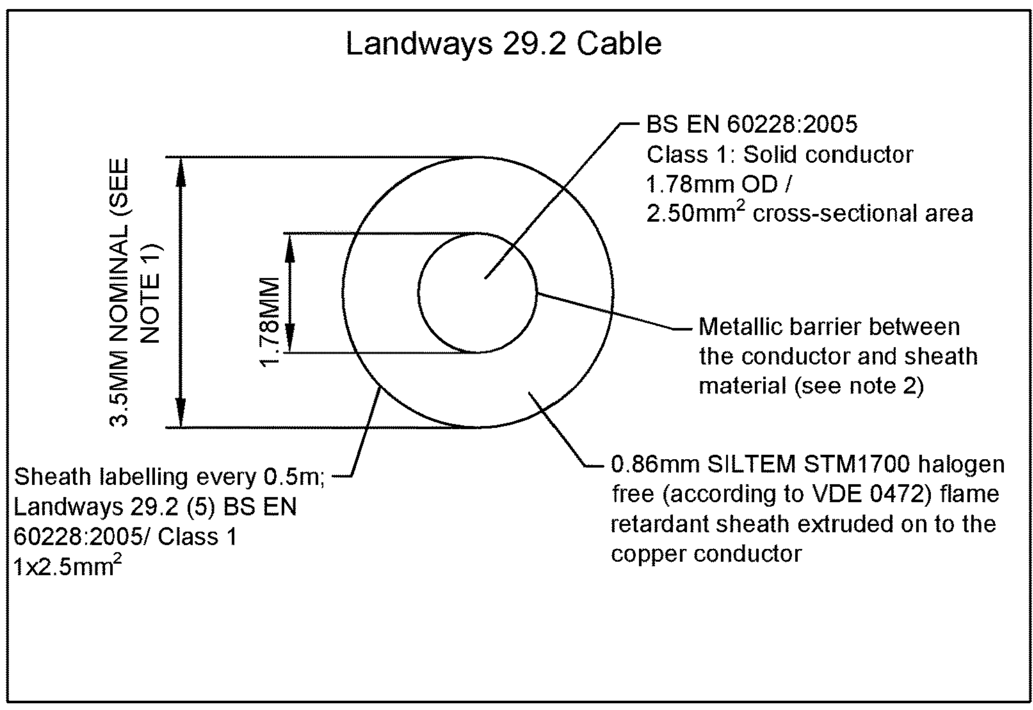
FIG. 6 shows a schematic cross-sectional view of a copper cable in accordance with another embodiment of the first aspect of the present invention, having a single copper conductor.

FIGS. 5 and 6 illustrate copper conductor cables in accordance with an embodiment of the first aspect of the invention. Before looking at these examples, it is useful to make some general observations about the new cables proposed here.

Figure 8:
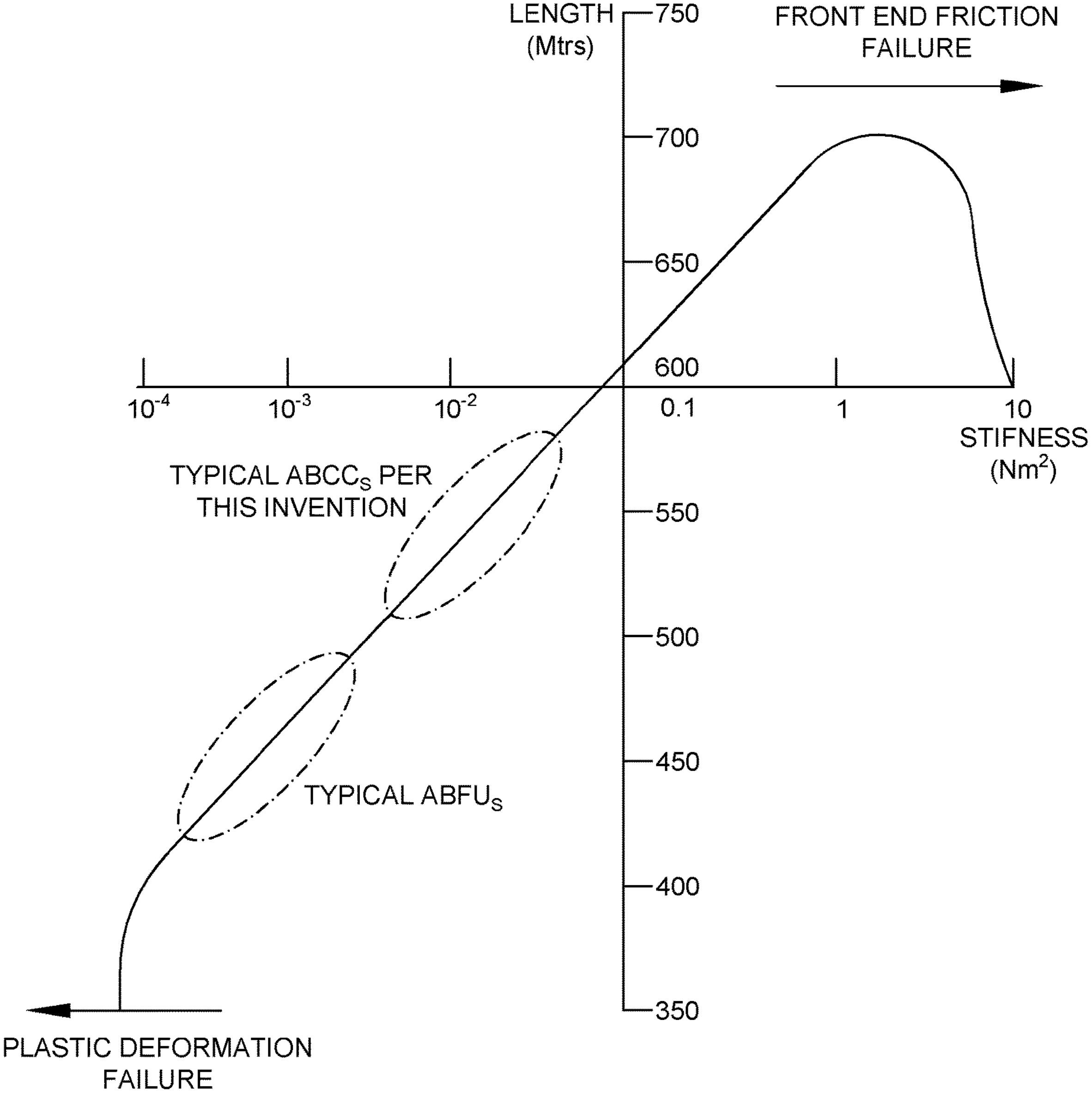
FIG. 8 is a graph showing cable stiffness on pushing vs blowing performance.

In designing optical fiber micro-cables, it is well understood that there is a range of stiffness over which acceptable pushing/blowing performance can be achieved. If the cable is too stiff, the pushing force required to be applied for it deflect from its axis to navigate bends will be too high and it will jam. However, if the cable is not stiff enough, the pushing force applied, particularly in the early stage of the installation operation will cause it to plastically deform and 'buckle,' either before entry or within the microducts. An illustration of these behaviors for various B (stiffness) factors (as measured in accordance with the process described in FIG. 9) is shown in FIG. 8.

In the case of optical fibers and especially small 'fiber units' (as defined in IEC 60794-5), the desired stiffness is achieved by creating a high stiffness inner core assembly of optical fibers, tightly bound together, counterbalanced by a much lower stiffness sheath. The composite stiffness is obtained using the parallel axis theorem. The parallel axis theorem sums the product of the tensile modulus and second moment of area of each component materials in an object, allowing for the distance of each element from the object's neutral axis. This means that components furthest from the neutral axis (i.e., 'outermost') contribute most, proportionally, to the 'B' value for the object as a whole.

Figure 9:
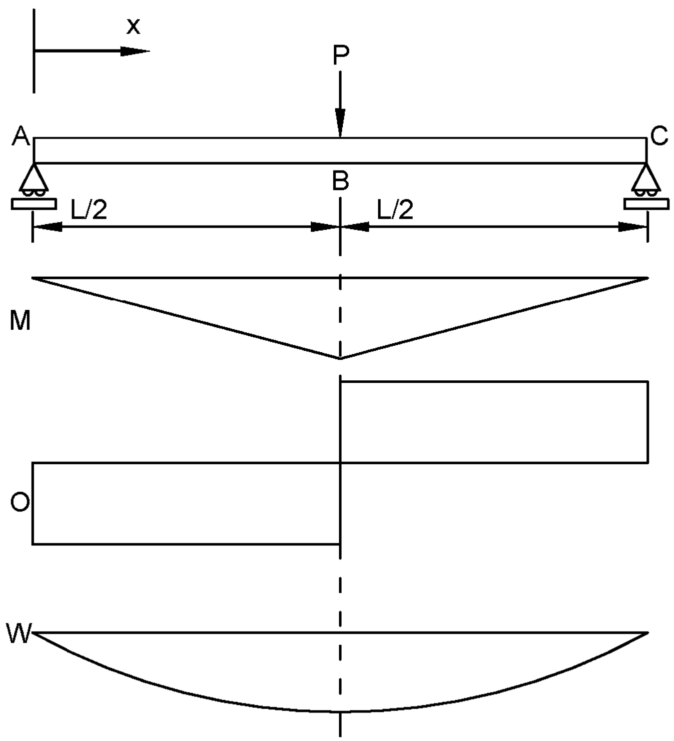
FIG. 9 explains the method used to measure cable stiffness.

The stiffness of a cable is easily measured by the 'Three Point Bending Method,' shown in FIG. 9.

In the case of the present invention, the objective is to create a copper conductor cable with the optimum properties for installation. The inner conductors are stiff (due to the high Tensile Modulus of copper) but are prone to 'plastic' deformation under compressive loads so that they buckle and remain in a deformed, 'bent' configuration. This is detrimental to installation as it creates additional, unwanted friction with the microduct side wall.

In embodiments of the first aspect of the present invention, the sheath is designed to be of sufficient tensile modulus, thickness and position to overcome the unwanted, buckling behavior of the copper conductors by forming a tight jacket that constrains the copper core. Typically, the tensile modulus of the sheath material is in the range 1 5 Gpa to 2.5 Gpa, preferably at least 2 Gpa or higher, and the thickness is in the range 0.2-2 mm, preferably higher than 0.4 mm.

In some embodiments, the composite stiffness of the cable (i.e., copper core(s) surrounded by the tightly bound sheath) is 0.01 to 0.1 $Nm^2$ (as measured in accordance with the method of FIG. 9).

The sheath may be made, in some embodiments, of a polymer with a relatively low coefficient of friction, for example a Coefficient of (dynamic) Friction of 0.3 or less, or more preferably 0.2 or less, reducing the force required to be applied and further enhancing its performance.

In embodiments of this aspect of the invention, the sheath material preferably also has an Elongation at Break of at least 10% and more preferably at least 15% to ensure the finished cable can be bent during handling and installation.

In some embodiments, the sheath is made of a material which exhibits excellent fire retardant, low smoke and zero halogen performance, giving significant safety benefits. This is especially important for indoor uses, where standards often dictate cables with fire retardant properties. For example, preferred materials will typically have a high Oxygen Index, for example exceeding 40, a UL 94 V0 rating at low thickness (e.g., 1.5 mm) and should not melt before approximately 300 C and, in doing so, produce minimal or no burning droplets.

In embodiments the sheath material is preferably extrudable using conventional cable manufacturing processes.

Examples of suitable sheath materials include polymer materials satisfying the above noted criteria, for example Polyetherimide ('PEI') polymers. PEI-siloxane copolymers are thought to be particularly suitable, one example being SILTEM™ STM1700 supplied by SABIC.

The inner copper conductor or conductor pair(s) can be engineered to a broad range of electrical performance specifications, including IEC/IS011801 for communications and/or power (generally in the form of 'Power over Ethernet') and EN50525 for power only.

Two alternative designs of such cables are shown in FIGS. 5 and 6.

FIG. 5 illustrates, in cross-section, a copper cable having multiple twisted pairs of copper conductors. Each of the copper conductors has an insulator around it. The conductors are then twisted together in pairs, in this example with 100 twists per meter. In this exemplary cable, there are 4 twisted pairs and these 4 pairs are themselves all twisted together with 20 twists per meter to form the core of the cable. A PEI-siloxane copolymer (e.g., SILTEM™ STM1700) sheath is then extruded around the core. As seen in FIG. 5, the resulting cable has an outside diameter of 4.75 mm.

FIG. 6 illustrates, in cross-section, a copper cable having a single copper conductor. The conductor is surrounded by a PEI-siloxane copolymer (e.g., SILTEM™ STM1700) sheath. The resultant cable in this example has an outside nominal diameter of 3.5 mm.

Figure 7:
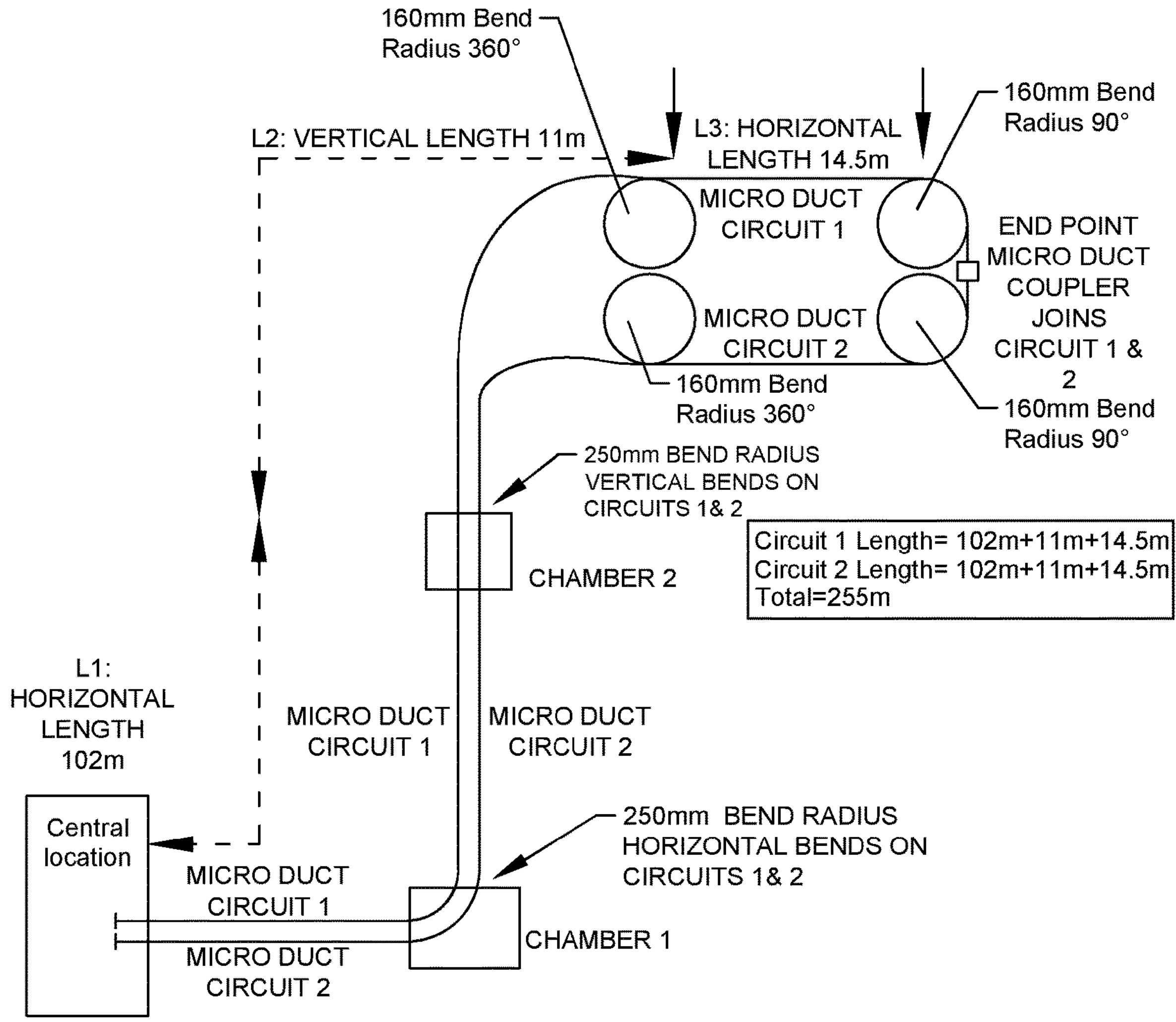
FIG. 7 illustrates a test circuit used to test cable blowing of a single copper conductor.

The cables have been tested using the test circuit in FIG. 7. The circuit contains bends as tight as 60 mm radius, as would be found inside commercial and domestic buildings.

The performance of the cables, when installed using air pressure of 15 bar, based on experiments using the test circuit, was:

| Conductor size/duct | Blown Distance | Time | Installation |
|---|---|---|---|
| 1.78 mmOD copper conductor as shown in FIG. 6<br>5.5/7 mm microduct | 255 m | 5.44 min | 47 m/min |

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include," and variations such as "comprises," "comprising," and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A cable for power distribution and/or data transmission, the cable comprising:

a core comprising one or more metallic conductors; and a sheath surrounding the core, the sheath being formed from a polymer having a tensile modulus of at least 1.5 GPa;

wherein the outside diameter of the sheath is no more than 13.5 mm; and the stiffness of the cable is at least 0.01 $Nm^2$.

2. A cable according to claim 1, wherein the outside diameter of the sheath is at least 4.5 mm.

3. A cable according to claim 1, comprising a barrier layer around the core, between the core and the sheath.

4. A cable according to claim 3, wherein the barrier layer is formed from a tape wound spirally around the core or applied longitudinally around the core.

5. A cable according to claim 1, comprising an electrical insulating sleeve around the or each metallic conductor.

6. A cable according to claim 1, wherein the core comprises a plurality of twisted metallic conductor pairs.

7. A cable according to claim 1, wherein the outer surface of the sheath has a coefficient of friction of 0.3 or less.

8. A cable according to claim 1, wherein the sheath is fire retardant.

9. A cable according to claim 1, wherein the tensile modulus of the polymer from which the sheath is formed is at least 2 GPa.

10. A cable according to claim 1, wherein the stiffness of the cable is in the range 0.01 to 0.1 $Nm^2$.

11. A cable according to claim 1, wherein the power transmission capacity of the cable is at least 70W.

12. A cable system comprising:

one or more bundles or microducts, each bundle comprising a plurality of microducts;

at least one optical fibre installed in one of the plurality of microducts; and at least one metallic conductor cable installed in another of the plurality of microducts, wherein the at least one metallic conductor cable includes a core comprising one or more metallic conductors, a sheath surrounding the core, wherein the sheath is formed from a polymer having a tensile modulus of at least 1.5 GPa, wherein an outside diameter of the sheath is no more than 13.5 mm, and wherein the stiffness of the cable is at least 0.01 Nm2.

13. A method of installing cables, comprising:

installing one or more microduct bundles, each bundle comprising a plurality of microducts;

blowing at least one optical fibre into one of the plurality of microducts; and blowing at least one metallic conductor cable into another of the plurality of microducts, wherein the at least one metallic conductor cable includes a core comprising one or more metallic conductors, a sheath surrounding the core, wherein the sheath is formed from a polymer having a tensile modulus of at least 1.5 GPa, wherein an outside diameter of the sheath is no more than 13.5 mm, and wherein the stiffness of the cable is at least 0.01 Nm2.

* * * * *